United States Patent Office 2,927,637
Patented Mar. 8, 1960

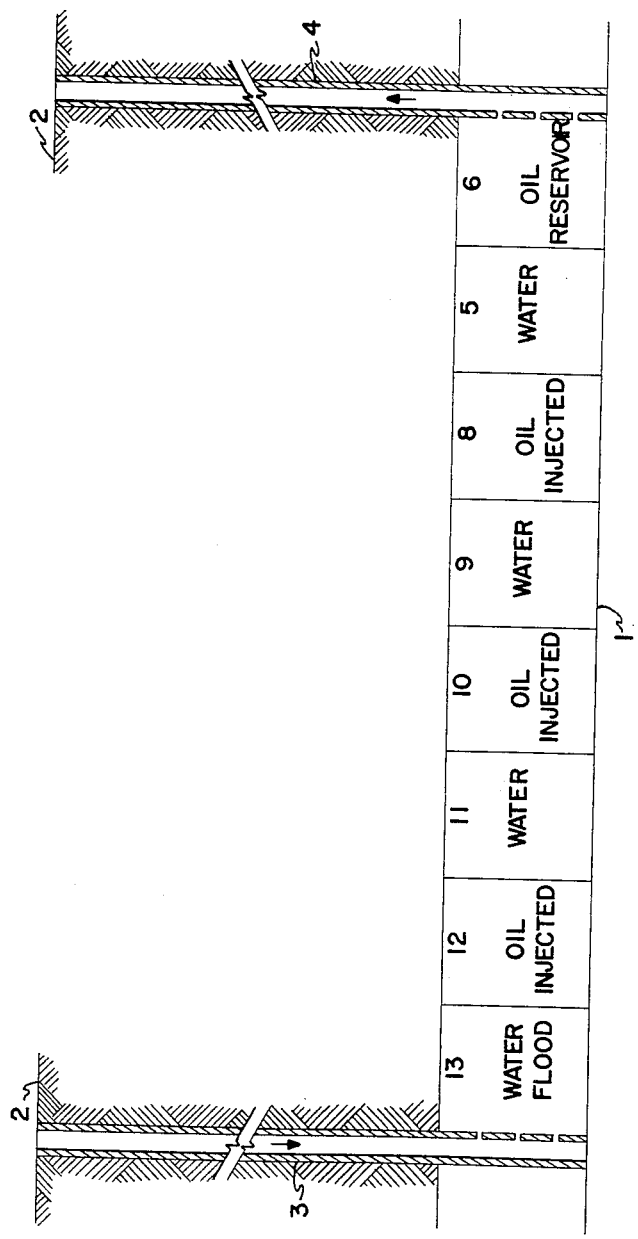

2,927,637

SECONDARY RECOVERY TECHNIQUE

Arthur L. Draper, Tulsa, Okla., assignor, by mesne assignments, to Jersey Production Research Company Application September 13, 1956, Serial No. 609,772

6 Claims. (Cl. 166—9)

The present invention is broadly concerned with an improved method for the recovery of crude petroleum from oil-bearing subterranean formations. The invention is more specifically concerned with an improved technique utilizing a particular combination of water banks and oil banks as a driving medium. In accordance with the present invention, a secondary recovery operation is carried out wherein the formation is flooded employing a plurality of alternate water and oil banks.

It is well known in the art to use various methods and techniques for removing oil in secondary recovery operations. For example, it has been suggested that gas be injected and that the reservoir be repressured. It is also known in the art to inject water at an injection well and to cause this water to flow toward a producing well driving oil ahead of it to the producing well. Another procedure suggested has been to introduce a bank of low-boiling hydrocarbon such as propane and to drive this bank by means of either water or natural gas toward the producing well. These methods have been successful to some degree. However, in many instances, the beneficial results have not been significant.

In accordance with the present invention an alternate injection technique is employed wherein a plurality of alternate banks of water and oil are passed or caused to flow from an injection well or wells to a producing well or wells. In accordance with a preferred adaptation of the invention the injected oil is of a higher viscosity than the oil being recovered from the reservoir when the reservoir is characterized by water wettability. When the reservoir is characterized by oil wettability, the preferred adaptation of the invention would be the use of an injected oil of a lower viscosity than the oil being recovered.

It is critical in the practice of the present invention that the alternate bank injection flooding technique be carried out so that the individual banks remain discrete and separate. In particular, the oil banks should not bypass the water banks. If they are permitted to bypass or outrun the water banks, the oil banks mix with the oil in the formation and are produced ahead of the water banks with no appreciable increase in oil recovery. The process then merely behaves like a waterflood.

To obtain a good volumetric flushing efficiency in every part of a reservoir in accordance with this invention, a volume being flushed in any part of the reservoir should have discrete and separate alternate banks of water and oil passing through it. In this manner, an increase in oil recovery is obtained with the oil injected in the banks produced from the formation still as discrete banks. The injected oil is entirely recovered from the reservoir together with an amount of oil greater than would have been recovered by straight waterflooding.

As stated earlier herein, it is considered that in the application of the process of this invention to field reservoirs the use of an oil more viscous than the oil in place should be used when the reservoirs are water-wet. The use of the more viscous oil in these instances results in an additional improved oil recovery apparently because of the tendency of the more viscous oil to overcome the inefficiencies inherent in straight waterflooding only imposed by normal stratification occuring in reservoirs. The injection of a material more viscous than the oil in place as a flooding material results in a more uniform displacement from the reservoir. Also, because of the higher viscosity of the oil used in the alternate driving banks of water and oil, a more favorable sweep of the reservoir is obtained—i.e., more of the reservoir is contacted by the injected fluids passing from an injection well to a production well. Therefore, the reduction of the effects of reservoir stratification and the increase in the portion of the reservoir swept coupled with the improved flushing efficiency of every reservoir volume contacted by the alternate and discrete banks of water and oil yields a substantial improved recovery of the oil in place.

While the oil recovery which may be attributed to decreasing the effects of stratification and increasing the swept portion is of practical importance, the critical effect is created by the alternate water and oil banks moving through the reservoir. These banks result in a lower residual oil and therefore in a higher oil recovery than other various methods and techniques for removing oil from the reservoir in secondary recovery operations. A method and technique for insuring the continuous separation of the water and oil banks as they pass through the reservoir is of basic importance to the practice of the invention as the discrete banks or slugs of water and oil are driven by the subsequent water injection to yield the improved oil recovery.

In accordance with the present invention, the mobility or mobility factor of the oil banks or slugs should be about equivalent to the mobility or mobility factor of the injected water bank or slug. If this be done, the tendency for the respective injected alternate banks to mix and outflow or outrun one another is substantially eliminated. The mobility factor of water, for example, may be expressed as $$\frac{k_w}{M_w}$$

wherein $k_w$ equals formation relative permeability to water at a particular oil saturation and $M_w$ equals formation viscosity of water.

The mobility or mobility factor of oil, on the other hand, is $$\frac{k_o}{M_o}$$

wherein $k_o$ equals formation relative permeability to oil at a particular water saturation and $M_o$ equals formation viscosity of oil.

The mobility factors compared for the purposes of this invention are those of water at residual oil saturation and of oil at residual water saturation.

Thus in accordance with the present invention, if $k_w$ equals 100 millidarcies (md.) and $M_w$ equals 0.80 centipoise (cp.), then the mobility of water equals:

$$\frac{k_w}{M_w} \text{ equals } \frac{100}{0.80} \text{ equals } 125 \text{ md./cp.}$$

If the formation relative permeability of oil equals 200 millidarcies (md.), then $$125 \text{ equals } \frac{200}{M_o}$$

$M_o$ equals 1.6 cp.

It is thus essential that under the conditions specified, the viscosity of the injected oil $M_o$ equals 1.6 cp.

As a further illustration, if the formation relative permeability to water at residual oil saturation ($k_w$) equals 50 md. and if the formation viscosity of water ($M_w$) equals 0.80 cp., then $$\frac{k_w}{M_w} \text{ equals } 62.5$$

Thus, if the formation relative permeability to oil is 200 md., then $$62.5 \text{ equals } \frac{200}{M_o}$$

$$M_o \text{ equals } 3.2 \text{ cp.}$$

From the above it is apparent that the driving injected oil must have a viscosity which is a function of the viscosity of the water and the relative permeability factors of the injected oil and water so that the alternating banks of injected oil and water will have the same mobility factor.

The process of the present invention may be more fully understood by reference to the drawing illustrating one embodiment of the same. Referring specifically to the drawing, a producing formation 1 is shown positioned below the earth's surface 2. Bore holes 3 and 4 extend from the earth's surface to the producing formation. In accordance with the concept of the present invention, alternate banks of water and oil are injected into formation 1 through bore hole 3 by means of suitable pumping equipment and the like. The condition of the reservoir is illustrated in the drawing just prior to the point when the first injected bank of water 5 reaches production bore hole 4. At this condition, reservoir oil 6 is being driven ahead of waterbank 5 and being produced from production bore hole 4. The water bank 5 in turn is being driven by oil bank 8 which in turn is being driven by water bank 9 which in turn is being driven by oil bank 10. At this point the bore hole 3 is filled with water which is driving the respective alternate banks. In the particular operation described, three banks of injected oil are injected and thus the entire reservoir, after oil bank 12 reaches bore hole 4, will be filled with water. While the operation has been described utilizing three injected banks of oil, it is to be understood that as many as six slugs or banks may be employed or even more depending upon the nature of the reservoir conditions. However, in general, it is preferred to use from two to four injected slugs or banks of oil alternately with banks of water. The oil injected in the banks or slugs is recovered from the reservoir as oil production so that the choice of the optimum number of banks of oil to be used in a particular application may be determined for that reservoir by laboratory measurements. The optimum number is set by the maximum additional oil recovered by the least number of banks whose injection and subsequent passage through the reservoir by the following water drive therefore take the least time. This procedure corresponds to the most economically attractive method of employing the process.

The process of the present invention may be further understood by the following illustrative examples which obviously however are not intended to be limiting with respect to field procedure or operating conditions. The two examples show two ways of preserving the bank separation. The first employs larger water banks with oil banks of oil having the same viscosity as the oil in place. The second employs oil banks of oil having a higher viscosity than the oil in place but with the same mobility as the water in the water banks. Both operations are equivalent in the recovery of additional oil but the second method is considered superior for field operations.

*Examples*

Experiments were performed in a 14" long cylindrical core 2" in diameter mounted with expanding low melting point alloy in a 2⅜" steel pipe and sealed by means of O rings to flanges at the end to permit flooding of the core. The core material was taken from an outcrop of Torpedo sandstone. This sandstone material is characterized as being hydrophilic or preferably water wet. A straight waterflood of the test core was made to give a reference behavior for the process. Two experiments were made on the alternate injection technique. After every experiment, the core was restored to its equivalent initial oil and connate water saturations by completely saturating the core with brine. The initial oil saturation was then established by flushing the core with a high viscosity (approximately 100 cp.) oil which was subsequently replaced by a low viscosity (1.3 cp.) oil typical of many original formation oils suited to waterflooding.

The formation relative permeability to water at residual oil saturation ($k_w$) was approximately 125 millidarcies. The viscosity of the salt water or brine used in the formation had a viscosity ($M_w$) at room temperature of approximately 1.0 centipoise. The mobility is given by $$\frac{k_w}{M_w} = \frac{125}{1} = 125 \text{ millidarcies/centipoise}$$

Also, the formation relative permeability to oil at residual water saturation ($k_o$) was estimated at 600 millidarcies. Requiring equality of the mobility of the oil to the water gives $$\frac{k_o}{M_o} = 125 = \frac{600}{M_o}$$

the oil viscosity ($M_o$) is therefore equal to 4.8 centipoises.

Two separate flooding experiments were made under the above conditions. In one, the oil used in the injected oil banks was the same oil as the oil in place and therefore had the same viscosity. The water banks used to separate the oil banks were five times as large as the oil banks. This experiment is designated Experiment 1. In the other experiment, the oil used in the injected oil banks was a different oil from the oil in place and had a viscosity of 5.0 centipoises. The oil banks were injected alternately with water banks which were of the same equivalent size. This experiment is designated Experiment 2. In both experiments the banks or slugs were driven through the core by a water flood.

The results of the experiments are as follows:

| | Experiment 1 | Experiment 2 |
|---|---|---|
| Pore Volume (PV) of Core, cc | 152 (1.0 PV) | 152 (1.0 PV) |
| Initial Oil Saturation, cc | 122 | 122 |
| Initial H₂O Saturation, cc | 30 | 30 |
| Viscosity of Oil in Place, cps | 1.3 | 1.3 |
| Viscosity of Injected Oil, cps | 1.3 | 5.0 |
| Viscosity of Injected Water, cp | 1.0 | 1.0 |
| Volume of Water Banks, cc | 60 (0.395 PV) | 12 (0.079 PV) |
| Number of Water Banks used | 3 | 3 |
| Volume of Oil Banks, cc | 12 (0.079 PV) | 12 (0.079 PV) |
| Number of Oil Banks Used | 3 | 3 |
| Total Oil Volume Injected, cc | 36 (0.237 PV) | 36 (0.237 PV) |
| Total Oil Volume Produced, cc | 113.5 | 112 |
| Injected Volume of Oil, cc | 36 | 36 |
| Net Volume of Original Oil in Place Produced, cc | 77.5 | 76 |
| Comparisons: Comparisons of oil recovery by the reference water flood and the alternate banks method are as follows: | | |
| Volume of Original Oil in Place Produced in Reference Waterflood, cc | 65 | 65 |
| Increase in Volume of Oil Recovered by Method of Invention, cc | 12.5 | 11 |
| Percentage Increase in Oil Recovery | 19.5 | 16.5 |

From the above it is apparent that in Experiment 1 the oil recovered was about 20% more than straight water flooding while in Experiment 2 the oil recovered was about 16% greater than the oil recovered by straight water flooding.

The length and volume of the respective banks may vary appreciably. In general it is preferred that the respective volumes of injected oil banks be substantially equivalent to one another and that the volume of the injected water banks be substantially equivalent to each other. It is preferred that the respective volumes of the oil banks to the volumes of the water banks are such that the oil banks not exceed the volumes of the water banks. It is preferred that the volume of the oil banks be from about 25% to 75% of the volume of the water bank.

The volumes of the individual banks or slugs of oil utilized are in the range of from about 0.5 to 10% of the pore volume of the reservoir being processed. A preferred range for the individual oil bank is from about 2% to 4% of the pore volume of the reservoir.

What is claimed is:

1. A process for the recovery of oil from a preferentially water-wet subterranean reservoir which comprises passing a plurality of alternate banks of water and oil from an injection well through the reservoir to a production well, preselecting the injected oil to have a mobility about equivalent to the mobility of the injected water, further preselecting the injected oil to have a viscosity least equal to the viscosity of the reservoir oil.

2. A process as defined in claim 1 in which the injected oil has a viscosity greater than that of the reservoir oil.

3. A process as defined in claim 1 in which the banks of water are substantially equal in volume to one another and the oil banks are also substantially equal in volume to one another.

4. A process as defined in claim 3 in which the volume of each oil bank is about 25% to 75% of the volume of each water bank.

5. A process for the recovery of oil from a preferentially water-wet subterranean oil reservoir which comprise injecting a plurality of alternate banks of water and oil through the reservoir from an injection well to a production well, preselecting the injected oil to have a mobility about equal to that of the injected water and a viscocity greater than that of the reservoir oil, the banks of water being equal in volume to one another and the banks of oil also being equal in volume to one another, each bank of oil having a volume between about 25% and 75% of the volume of each water bank and constituting about 0.5% to 10% of the pore volume of the reservoir being processed.

6. A process as defined in claim 5 in which each oil bank has a volume constituting about 2% to 4% of the pore volume of the reservoir being processed.

References Cited in the file of this patent

UNITED STATES PATENTS 2,669,306　　Teter et al. _____ Feb. 16, 1954